Sept. 6, 1955  P. W. MARTIN  2,716,890
APPARATUS FOR DETERMINING POINT AT
WHICH A PIPE IS STUCK IN A WELL
Filed Oct. 3, 1949  2 Sheets-Sheet 2
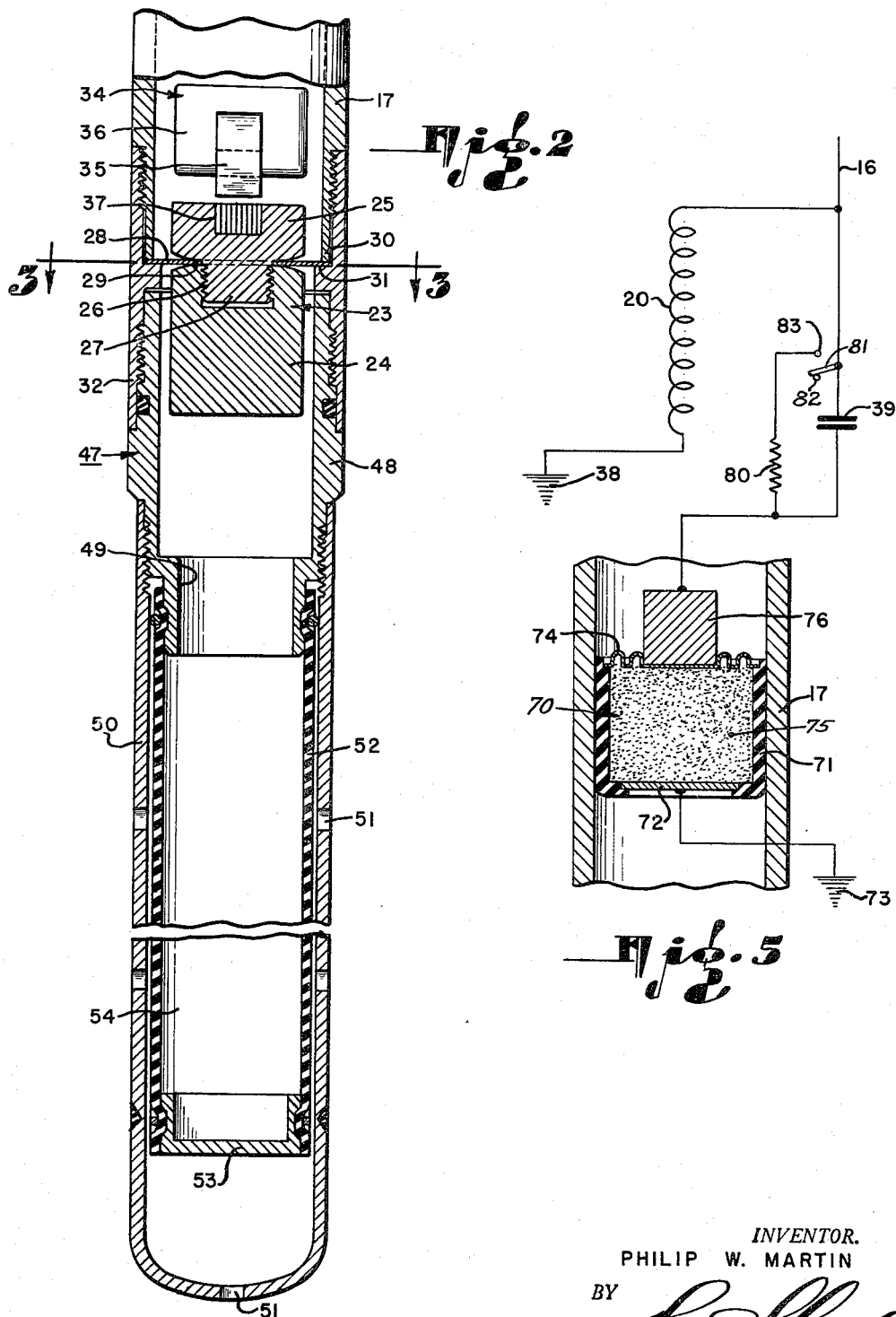
INVENTOR.
PHILIP W. MARTIN
BY
ATTORNEY United States Patent Office 2,716,890
Patented Sept. 6, 1955

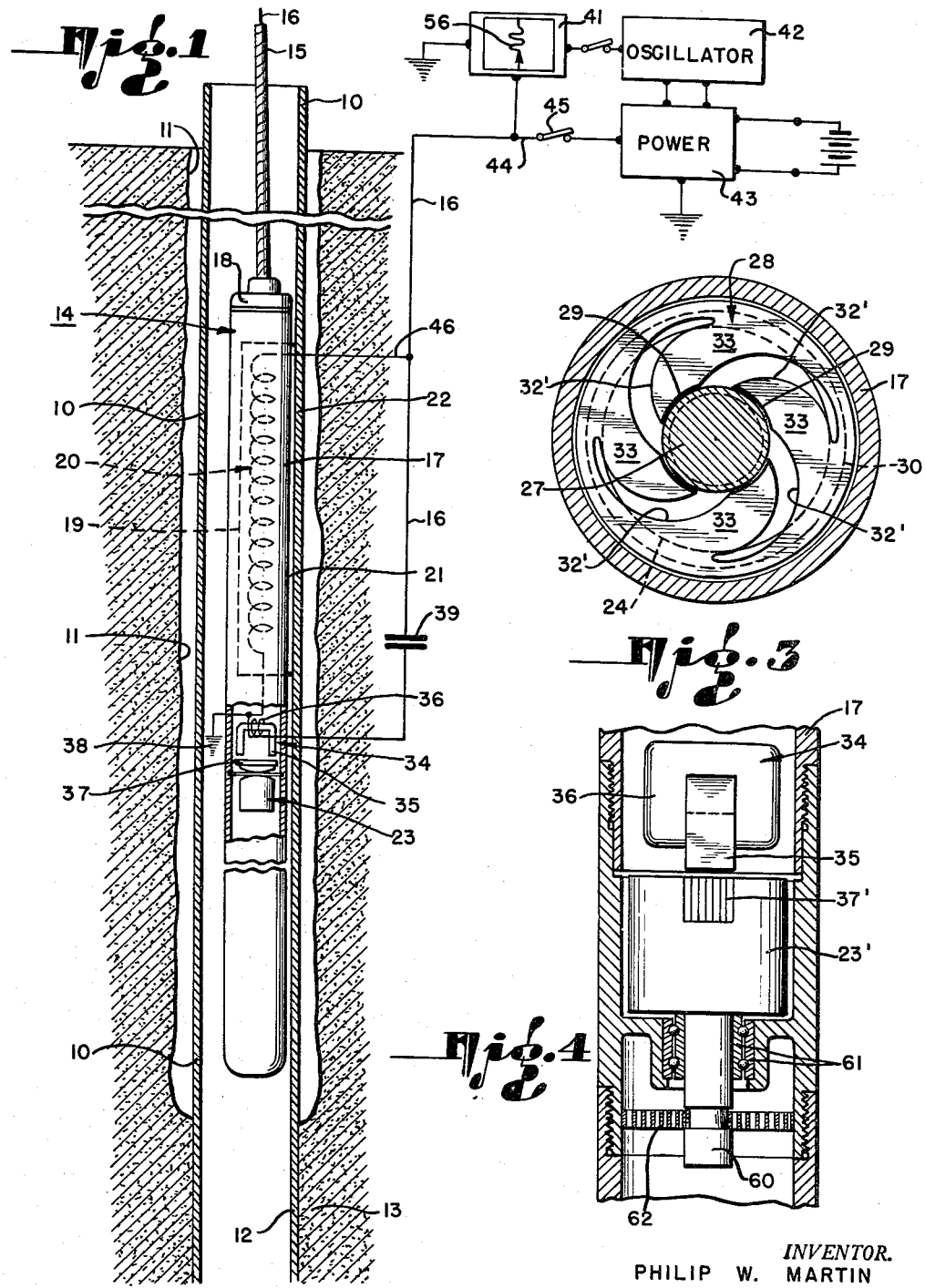

2,716,890

APPARATUS FOR DETERMINING POINT AT WHICH A PIPE IS STUCK IN A WELL

Philip W. Martin, Huntington Park, Calif.

Application October 3, 1949, Serial No. 119,302

8 Claims. (Cl. 73—151)

My invention relates to a device for determining which portions of a member, such as a pipe, tube or casing in a well are movable, and thereby obtaining information as to the point or location at which the pipe is stuck or frozen in the well so as to prevent removal of the member from the well. The invention disclosed herein is an improvement on the inventions disclosed in my copending applications Serial No. 619,242, now Patent No. 2,530,308, Apparatus for Determining Movability of Members in Wells, filed September 28, 1945, and Serial No. 641,279, now Patent No. 2,530,309, Device for Determining Relative Movements of Parts in Wells, filed January 15, 1946.

The important utility of the invention is in determining the point at which a pipe is stuck in a well. As an example of the usefulness of the invention, reference may be had to the practice of drilling wells by rotary method wherein the hole is made by rotation of a string of drill pipe having a tool fixed on the lower end thereof. Due to conditions often beyond the control of the driller the drill pipe may become stuck in the well. In order to accomplish a satisfactory removal of all or part of this drill pipe from the well, it is necessary to know with reasonable accuracy the point at which the pipe is stuck in the well. Sometimes the lower portion of the pipe near the drill bit may be stuck, or the drill bit and the drill collar may be stuck. On the other hand the point at which the pipe is stuck may be intermediate the top and the bottom of the well. My copending applications referred to in the foregoing provide eminently satisfactory method and apparatus for locating the point at which a pipe is stuck in a well. My present invention, however, following a different concept, although being in general similar to my former inventions, provides certain advantages which will hereinafter be pointed out and described in detail.

It is an object of the invention to provide an apparatus for determining not only whether a portion of the pipe in the well is movable, but which will also indicate the distance of the tested portion of the pipe from the point at which the pipe is stuck in the well. This is believed to be an important advance in the art to which the invention pertains. By use of the present invention, the operator may lower the testing device into the well, make a test of a selected portion of the pipe and from the indication received at the top of the well have knowledge of how far the device must be moved in the well to reach the point at which the pipe is stuck in the well. Having this knowledge he is enabled to move the device to the proximity of the indicated stuck point and there make relatively few tests to actually determine the level of the stuck point. He thereby avoids the necessity of making a larger number of tests along the stuck point. The device shown in my copending application Serial No. 641,279, now Patent No. 2,530,309, indicates movability of a selected portion of a pipe in the well by reference to two spaced points on the portion of the pipe being tested. Therefore, in the use of the previous device, for a given pull on the upper end of the stuck pipe, the indication of movability obtained by progressive tests along the movable portion of the pipe above the stuck point are all the same until the lower end of the device reaches the stuck point, at which time there will be a reduction in the indication at the surface of the ground, which reduction will advise an observer of the relation of the device to the stuck point. In the use of the device shown in the present application a large indication of movability is indicated at the top of the well when the device is a large distance away from the stuck point, and this indication gradually diminishes as the device is consecutively moved through test positions toward the stuck point, the indication reaching zero value when the device is located at the stuck point. For example, in the use of the applicant's device, the indication received when the device is located 1000 ft. from the stuck point will correspond to this distance so that the operator will know that the device is positioned substantially 1000 ft. from the point at which the pipe is stuck.

It is an object of the invention to provide a device which not only has a number of points of functional superiority, but also requires a smaller number of parts, some of which parts are relatively heavy and expensive.

It is an object of the invention to provide an apparatus whereby engagement of a selected portion of a pipe stuck in a well is made by a single supporting part having an inertia element or mass supported therein. The engagement of the first named part with the pipe is such that when movement of the pipe occurs, the inertia member tends to remain stationary, there being relative movement between the supporting part and the inertia element, which relative movement is an indication of movement of the portion of the pipe engaged by the supporting part of the device.

It is an object of the invention to provide a device of the character described in the preceding paragraph having means for producing an electrical magnitude or variations in electrical magnitudes representative of the relative movement of the inertia element and the supporting part of the device, with means at the top of the well for receiving the electrical magnitude and indicating not only movement of the tested portion of the pipe but also the extent of movement of the tested portion of the pipe with relation to the earth through which the pipe extends.

It is a further object of the invention to provide devices embracing the inventive concept proposed herein which respond to vertical movement or jar of the portion of the pipe in the well being tested, or to rotary movement or torque in the portion of the pipe in the well being tested. The inertia element of the device may be supported with the supporting part of the device by use of a number of different yieldable or resilient means, and, as will be hereinafter explained in detail the relative movement of the supporting part and the inertia element may be indicated by a number of different electrical devices.

Further objects and advantages of the invention will be brought out in the following part of the specification, wherein I have described embodiments of my invention in detail for the purpose of complete disclosure, without limiting the scope of the invention embodied in the appended claims which are entitled to a construction embracing use of all reasonable mechanical equivalents.

Referring to the drawings which are for illustrative purposes only:

Fig. 1 is a schematic view showing a preferred form of my invention in a well, this view also embracing an electrical diagram of cooperating parts of the invention.

Fig. 2 in an enlarged fragmentary sectional view showing to enlarged scale the sensing means of Fig. 1.

Fig. 3 is a sectional view taken as indicated by the line 3—3 of Fig. 2.

Fig. 4 is a fragmentary sectional view showing an alternative form of means sensitive to relative movement produced by movement of a portion of the pipe in the well.

Fig. 5 is a fragmentary sectional view showing another form of sensing means.

In Fig. 1, I show a portion of a pipe 10 extending into a hole 11. The pipe 10 may be a portion of a drill pipe having a drilling tool on its lower end, not shown, which drilling tool has formed the hole 11 which hole 11 will be identified as a well. The pipe 10 has a part 12 stuck in the well, as the result of a wall 13 of earthy substance gripping the portion 12 of the pipe 10. This wall of earthy substance 13 may be the result of a cave-in of the wall of the well 11, or it may have resulted from settlement of sand and cuttings from the drilling mud which is used in the rotary drilling operation.

Within the pipe 10 I show a testing instrument 14 suspended by and moved from place to place in the pipe 10 by a cable 15 through which an insulated conductor 16 extends. The testing instrument 14 comprises a cylindric shell 17 which is connected to the cable 15 by means of a rope socket 18. The upper part of the casing 17 has therein a vertically elongated electromagnet 19 provided with a winding schematically indicated at 20. This electromagnet 19 although vertically elongated has a portion 21 thereof extending laterally so as to be exposed at a side of the shell 17 for engagement with a selected portion 22 of the wall of the pipe 10. When the electromagnet 19 is energized, the shell 17, which constitutes a supporting member for other parts of the device, is forcefully locked to the portion 22 of the pipe and any movement of the portion 22 of the pipe will be transmitted to the shell 17.

In the shell 17 below the electromagnet 19 there is an inertia element 23. As best shown in Fig. 2, the inertia element 23 comprises a lower mass 24 and an upper mass 25, the lower mass 23 having a threaded opening 26. The inertia element 23 is supported for movement in vertical direction relative to the shell or support 17 by a disk spring member 28 having an opening 29 to receive the pin 27 of the upper mass. The periphery of the spring 28 is clamped between the downwardly projecting lip 30 of the shell 17 and a shoulder 31 provided by a sleeve 32 which threads onto the lower end of the shell 17. The disk spring is of volute character. It has spiral slots 32' leading outward from the opening 29 so as to form therebetween volute spring elements 33 which flexibly support the inertia element 23.

The invention also includes means for indicating and measuring relative movement of the shell or support 17 and the inertia element 23. This indicating and measuring means operates in the locality of the inertia element 23, and in the form of the invention shown in Figs. 1 and 2, this indicating means comprises a variable inductor 34 having a field part 35 of horseshoe shape, with a winding 36 thereon. In spaced relation to the legs of the field part 35 an armature 37 is supported by the upper mass 25 of the inertia element 23. Movement of the armature 37 with relation to the field part 35 varies the impedance in an oscillator circuit. The winding 36 is connected to ground at 38 and is connected through a condenser 39 with the wire 16 of the cable 15, this wire 16 being indicated separately alongside the instrument 14 and the cable 15 as part of a wiring diagram. The upper end of the wire 16 is connected through a meter or indicator 41 with an oscillator 42 which receives power from a power source 43 such as a power pack of a type to be energized by a battery. Through conductor means 44 and a switch 45, the upper end of the wire 16 is connected to the power source 43. Also, a conductor 46 connects one end of the winding 20 of the electromagnet 19 with the wire 16, the other end of the winding 20 being connected to the ground 38.

To the lower end of the sleeve 32 a pressure balancer 47 is secured, this pressure balancer comprising a bushing 48 having a cylindrical projection 49 within the upper end of a shell part 50 provided with openings 51 for entry of fluid. A rubber tube 52 has its upper end secured to the cylindrical projection and has its lower end closed by a plug 53. The space 54 within the tube 52 and within those portions of the shell 17 above the part 50 are filled with a dielectric oil.

In the operation of the invention the instrument 14 is lowered into the pipe 10 to a point estimated to be well above the pipe stuck point. Then the switch 45 is closed so that direct current from the power source 43 is fed through the winding 20 of the electromagnet 19, producing a heavy magnetic flux in the electromagnet which causes it to be affixed to the pipe 10. The strength of the electro-magnet 19 is such that movement of the portion of the pipe 10 to which the electromagnet 19 is attracted will move the shell or support. Due to physical laws relating to mass, the inertia element 23 tends to remain stationary. That is to say, this inertia element 23 does remain stationary for a short period of time or momentarily after movement of the support 17 has started. Accordingly, when the portion of the pipe 10 to which the instrument 14 is magnetically attached moves, the support 17 moves and the action of inertia within the member 23 causes relative movement of the parts 17 and 23 and likewise relative movement of the parts 35 and 37 which is an indication of movement of the support 17 and of the portion of the pipe 10 which is engaged by the electromagnet. The variation in the reluctance of the magnetic field associated with the winding 36 produces electrical effects which are transmitted to the surface. The variation in reluctance changes the impedance in the circuit supplied by the oscillator 42, with a corresponding change in voltage acting upon the indicating meter 41 and causing a deflection of the needle of this indicator 41. Of course, relative movement of the support 17 and the inertia element 23 flexes the spring 28, and produces a vertical oscillation of the inertia element 23 following the first relative movement of the parts 17 and 23. If the indicator 41 is of recording type the needle thereof may describe a curve at 56, Fig. 1. Movement of the pipe may be accomplished in a number of different ways. The hoisting cable of the derrick may be connected to the upper end of the pipe 10 and a quick pull may be applied, this pull producing vertical movement of all portions of the pipe down to the stuck point 12. The hoisting line of the derrick may exert an upward force on the upper end of the pipe 10, and this force may be suddenly released.

An important advantage of the present invention is that by use of suitable calculations or proper indicating means, it is possible to determine the distance of the instrument 14 from the stuck point. For example, let us assume that the instrument 14 is located 1000 ft. above the stuck point. If the pipe is stretched 1 in. per 100 ft., the movement of the support 17 will be 10 in. If the instrument 14 is located 500 ft. from the stuck point the movement of the support 17 by the adjacent portion of the pipe 10 will be 5 in. At 100 ft., 50 ft., and 25 ft., the movements of the support 17 will be respectively 1 in., ½ in., and ¼ in. These different movements of the support 17 produce different actions of the inertia element 23 and different indications by the indicating device 41 at the top of the well.

As shown in Fig. 4, the inertia element 23' may be supported for rotation around its own axis or around another axis. In Fig. 4, the inertia element 23' is shown with a downwardly projecting shaft 60 supported by bearings 61 and being held resiliently in an initial position by a coil spring 62. In the upper part of the inertia element 23 there is an armature 37' disposed in spaced relation to the U-shaped field piece 35 of the variable inductor 34 described with relation to Figs. 1 and 2. The only difference in the operation of the mechanism shown in Fig. 4 from that shown in Figs. 1 and 2 is that when rotation is applied to the pipe 10, the inertia element 23' tends to remain stationary while the support 17 rotates with relation to it, thereby producing relative movement between the parts 35 and 37 and a change in the impedance of the circuit, which change in impedance will be recorded by the indicating means 41 as an indication that the portion of the pipe in the well to which the instrument is attached is movable and that therefore the instrument is not in engagement with the frozen or stuck portion of the pipe.

In the form of the invention shown in Fig. 5, I employ a carbon grain microphone 70 in the instrument 14 in place of the variable inductor 34 which has been previously disclosed. This carbon grain microphone or resistance pile comprises a shell of nonconducting material indicated at 71. In the bottom of the shell 71 there is a metal contact plate 72 which is connected to ground 73. Spaced from the contact plate 72 there is a flexible metal wall 74 and the space between the parts 72 and 74 is filled with carbon grains 75. The inertia element 76 is connected to the flexible wall 74, whereas, the container 71 for the carbon grains is connected to the shell or support 17 of the instrument 14. As shown in Fig. 5, the microphone sensing means 70 may be used in the circuit described in Fig. 1. Oscillating current passes through the mass of carbon granules 75. When relative movement of the support 17 and the inertia element 76 occurs, the container 71 will move with the support 17 and the pressure on the carbon granules will be changed in view of the fact that the inertia element 76 tends to remain stationary, and does, in fact remain stationary for a very short period of time after movement of the container 71 is started. The change in pressure on the carbon granules 75 will result in a change in impedance in the circuit which includes the indicator 41 and such change of impedance will be indicated, thereby advising an observer at the top of the well that movement of the portion of the pipe in the well to which the instrument is attached has occurred.

A resistance 80 is shown arranged to operate in conjunction with condenser 39 when a switch member 81 is moved from engagement with a stop 82 into engagement with a contact 83. At this time direct current alone may be used for energization of the coil 20 and for sensing variations in the resistance of the active elements of the microphone. Under this latter condition of operation the oscillator 42 may be eliminated and the meter 41 may be replaced by one responsive to direct current.

I claim:

1. In a device for determining the point at which a member is stuck in a hole by testing different portions of the member to see whether or not these portions are movable in the hole: a support adapted to be moved into the hole to a position adjacent a selected portion of said member; suspension means for moving said support in the hole from place to place along said member; engagement means extending laterally with respect to said support for effecting an engagement of said support with a selected portion of said member in the hole which will produce movement of said support by said portion of said member in the hole when the same is moved as the result of change in force applied to the member; an inertia element comprising a mass; yieldable means supporting said inertia element on said support so that it may remain stationary when said support is moved, thereby producing relative movement of said support and said inertia element; means operating in response to said relative movement of said support and said inertia element to produce an electrical effect which is an indication that said support has been moved by said portion of said member in the hole; means for transmitting said electrical effect to the surface of the ground; and indicating means at the surface of the ground arranged to receive and indicate said electrical effect and thereby evidence relative movement of said support and said inertia member.

2. In a device for determining the point at which a member is stuck in a hole, by testing different portions of the member to see whether or not these portions are movable in the hole: a support adapted to be moved into the hole; suspension means for moving said support in the hole from one selected position to another along said member; engagement means extending laterally with respect to said support for effecting an engagement of said support with a selected portion of said member in the hole which will produce movement of said support by said portion of said member in the hole when the same is moved as the result of change in force applied to the member; an inertia element comprising a mass; yieldable means supporting said inertia element on said support so that it may momentarily remain stationary when said support is moved, thereby producing relative movement of said support and said inertia element; means comprising an inductor having one relatively movable part connected to said support and another relatively movable part connected to said inertia element, operating in response to said relative movement of said support and said inertia element to produce an electrical signal which is an indication that said support has been moved by said portion of said member in the hole; means for transmitting said electrical signal to the surface of the ground; and means operating to manifest said indication at the surface of the ground.

3. In a device for determining the point at which a member is stuck in a hole, by testing different portions of the member to see whether or not these portions are movable in the hole: a support adapted to be moved into the hole; suspension means for moving said support in the hole from one selected position to another along said member; engagement means for effecting an engagement of said support with a selected portion of said member in the hole which will produce movement of said support by said portion of said member in the hole when the same is moved as the result of change in force applied to the member; an inertia element comprising a mass; means yieldably supporting said inertia element on said support for relative rotary movement so that said inertia element will tend to momentarily remain stationary with respect to rotation when said support is given a movement having a rotary component by said portion of said member in the hole, thereby producing relative movement of said support and said inertia element; means operating in response to said relative movement of said support and said inertia element to produce an electrical effect which is an indication that said support has been moved by said portion of said member in the hole; means for transmitting said electrical effect to the surface of the ground; and indicating means at the surface of the ground arranged to receive and indicate said electrical effect and thereby evidence relative movement of said support and said inertia member.

4. In a device for determining the point at which a member is stuck in a hole, by testing different portions of the member to see whether or not these portions are movable in the hole: a support adapted to be moved into the hole; suspension means for moving said support in the hole; engagement means for effecting an engagement of said support with a selected portion of said member in the hole which will produce movement of said support by said portion of said member in the hole when the same is moved as the result of change in force applied to the member, said engagement means comprising an electro-magnet and means controlled from the surface of the ground and operating to energize said electro-magnet; an inertia element comprising a mass; yieldable means supporting said inertia element on said support so that it may momentarily remain stationary when said support is moved, thereby producing relative movement of said support and said inertia element; means comprising an inductor having one relatively movable part connected to said support and another relatively movable part connected to said inertia element, operating in response to said relative movement of said support and said inertia element to produce an electrical signal which is an indication that said support has been moved by said portion of said member in the hole; means for transmitting said electrical signal to the surface of the ground; and means operating to manifest said indication at the surface of the ground.

5. In a device for determining the point at which a pipe member is stuck in a hole, by testing different portions of the member to see whether or not these portions are movable in the hole: a support adapted to be moved into the pipe member; suspension means for moving said support in the hole from place to place along said member; electrically actuated engagement means extending laterally with respect to said support for effecting an engagement of said support with a selected portion of said member in the hole which will produce movement of said support by said portion of said member in the hole when the same is moved as the result of change in force applied to the member; an inertia element comprising a mass; resilient means supporting said inertia element on said support for relative movement having a vertical component so that said inertia element will tend to remain stationary with respect to vertical when said support is imparted movement by movement of said portion of said member in the hole having a vertical component, thereby producing relative movement of said support and said inertia element; means comprising a variable resistor connected to said support and said inertia element, operating in response to said relative movement of said support and said inertia element to produce an electrical signal which is an indication that said support has been moved by said portion of said member in the hole; means for transmitting said signal to the surface of the ground; and electrical means at the surface of the ground operating to receive and indicate said signal.

6. In a device for determining the point at which a pipe member is stuck in a hole, by testing different portions of the member to see whether or not these portions are movable in the hole: a support adapted to be moved into the pipe member; suspension means for moving said support in the hole from place to place along said member; means for moving said support in the hole; electrically actuated engagement means for effecting an engagement of said support with a selected portion of said member in the hole which will produce movement of said support by said portion of said member in the hole when the same is moved as the result of change in force applied to the member; an inertia element comprising a mass; means yieldably supporting said inertia element on said support for relative rotary movement so that said inertia element will tend to remain stationary with respect to rotation when said support is imparted a movement having a rotary component by said portion of said member in the hole, thereby producing relatively movement of said support and said inertia element; means operating in response to said relative movement of said support and said inertia element to produce an electrical signal which is an indication that said support has been moved by said portion of said member in the hole; and electrical means operating to transmit said signal to the surface of the ground.

7. In a device for determining the point at which a pipe is stuck in a hole, by testing different portions of the pipe to see whether or not these portions are movable in the hole: a supporting member having a cavity, said supporting member being of a size to be moved into the pipe; suspension means for moving the member in the pipe from one selected portion to another; means extending laterally with respect to said support, operating to effect engagement of said supporting member with a selected portion of the pipe in the well whereby movement of said portion will move said supporting member; an inertia member comprising a mass disposed in said cavity of said supporting member; spring means connecting said inertia member to said supporting member so that when said supporting member is moved, said inertia member may momentarily remain stationary, thereby producing relative movement of said supporting member and said inertia member when said portion of said pipe moves said supporting member; means in said cavity comprising an inductor having one relatively movable part connected to said support and another relatively movable part connected to said inertia element operating in response to relative movement of said supporting member and said inertia member to produce an electrical effect which is an indication of said movement of said portion of said pipe; means for transmitting said electrical effect to the surface of the ground; and indicating means at the surface of the ground arranged to receive and indicate said electrical effect and thereby evidence relative movement of said support and said inertia member.

8. In a device for determining the point at which a pipe is stuck in a hole, by testing different portions of the pipe to see whether or not these portions are movable in the hole: a supporting member having a cavity, said supporting member being of a size to be moved into the pipe; suspension means for moving the member in the pipe from one selected portion to another; means extending laterally with respect to said support operating to effect engagement of said supporting member with a selected portion of the pipe in the well whereby movement of said portion will move said supporting member; an inertia member comprising a mass disposed in said cavity of said supporting member; yieldable means connecting said inertia member to said supporting member so that when said supporting member is moved, said inertia member may momentarily remain stationary, thereby producing relative movement of said supporting member and said inertia member when said portion of said pipes moves said supporting member; means in said cavity comprising a carbon microphone resistance element connected to said supporting member and to said inertia member, operating in response to relative movement of said supporting member and said inertia member to produce a signal which is an indication of said movement of said portion of said pipe; means for transmitting said signal to the surface of the ground; and means at the surface of the ground for receiving said signal and indicating its magnitude.

References Cited in the file of this patent

UNITED STATES PATENTS

| | | |
|---|---|---|
| 2,064,489 | Neuman | Dec. 15, 1936 |
| 2,161,256 | Karcher | June 6, 1939 |
| 2,286,897 | Costa et al. | June 16, 1942 |
| 2,300,384 | Johnston | Oct. 27, 1942 |

OTHER REFERENCES

Instruments, p. 638, July 1947.